United States Patent
Scheer et al.

(10) Patent No.: US 12,337,991 B2
(45) Date of Patent: Jun. 24, 2025

(54) AIRCRAFT CARGO HANDLING SYSTEM ARCHITECTURE

(71) Applicant: Goodrich Corporation, Charlotte, NC (US)

(72) Inventors: Dustin Paul Scheer, Jamestown, ND (US); Wesley K Stegmiller, Jamestown, ND (US); Aaron J Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 546 days.

(21) Appl. No.: 17/179,838

(22) Filed: Feb. 19, 2021

(65) Prior Publication Data

US 2021/0354826 A1 Nov. 18, 2021

Related U.S. Application Data

(60) Provisional application No. 63/024,969, filed on May 14, 2020.

(51) Int. Cl.
*B64D 9/00* (2006.01)

(52) U.S. Cl.
CPC ........ *B64D 9/003* (2013.01); *B64D 2009/006* (2013.01)

(58) Field of Classification Search
CPC .... B64D 9/003; B64D 2009/006; B64D 9/00; Y02T 50/40
See application file for complete search history.

(56) References Cited

U.S. PATENT DOCUMENTS

| | | | |
|---|---|---|---|
| 6,039,288 A | 3/2000 | Huber et al. | |
| 6,125,984 A * | 10/2000 | Huber | B64C 1/20 193/35 MD |
| 7,472,867 B2 * | 1/2009 | Huber | B64C 1/20 244/137.1 |
| 7,556,462 B2 * | 7/2009 | Huber | B64C 1/20 410/80 |
| 8,561,946 B2 | 10/2013 | Barmichev et al. | |
| 9,260,176 B2 | 2/2016 | Kulesha | |
| 9,545,990 B2 | 1/2017 | Stegmiller | |
| 10,292,798 B2 | 5/2019 | Lampe et al. | |
| 2003/0057326 A1 * | 3/2003 | Medina | B64D 9/00 244/137.1 |
| 2005/0224645 A1 * | 10/2005 | Huber | B64C 1/20 244/118.1 |

(Continued)

FOREIGN PATENT DOCUMENTS

| | | | | |
|---|---|---|---|---|
| DE | 102017128238 B3 * | 11/2018 | | B64C 1/20 |
| EP | 2441668 A2 * | 4/2012 | | B64C 1/20 |

(Continued)

*Primary Examiner* — Gene O Crawford
*Assistant Examiner* — Abby A Jorgensen
(74) *Attorney, Agent, or Firm* — SNELL & WILMER L.L.P.

(57) ABSTRACT

A cargo handling system may comprise a plurality of trays and a topskin. The plurality of trays may structurally support the topskin. The plurality of trays may be contiguously covered. The plurality of trays may be partially covered by the topskin. At least one of a ball transfer unit (BTU) or a roller assembly may be configured to be coupled to the topskin and/or disposed within a groove of a tray in the plurality of trays.

20 Claims, 6 Drawing Sheets

(56) References Cited

U.S. PATENT DOCUMENTS

| | | | | |
|---|---|---|---|---|
| 2010/0230230 A1* | 9/2010 | Huber | ................... | B64D 9/003 |
| | | | | 193/35 R |
| 2015/0225082 A1* | 8/2015 | Levron | ................... | B64D 9/00 |
| | | | | 244/137.1 |
| 2015/0367941 A1* | 12/2015 | Harden | ................. | B64D 9/003 |
| | | | | 244/118.1 |
| 2017/0313423 A1* | 11/2017 | Schoen | ................... | B64D 9/00 |
| 2018/0290724 A1* | 10/2018 | Nowarre | ............... | B65G 13/11 |

FOREIGN PATENT DOCUMENTS

| | | | | | |
|---|---|---|---|---|---|
| FR | | 2916422 A1 * | 11/2008 | ............... | B64C 1/20 |
| WO | WO-2015187621 A1 * | | 12/2015 | ................ | B60P 1/52 |

* cited by examiner

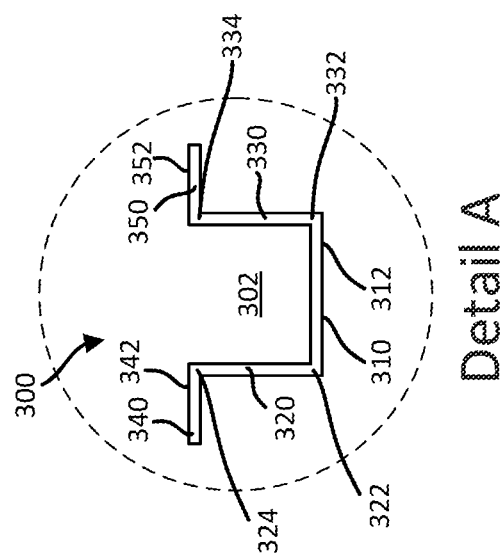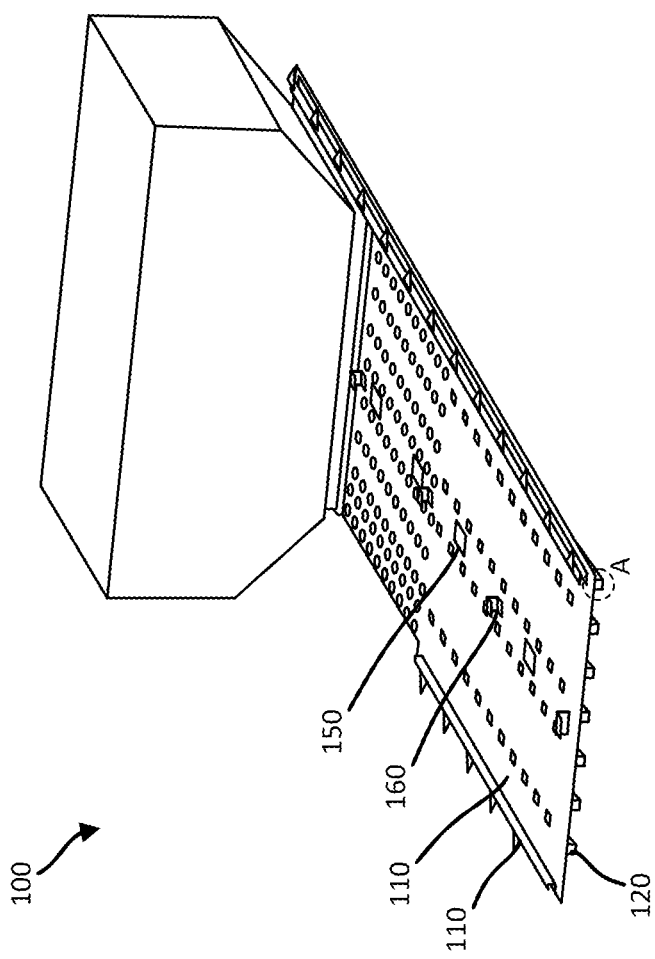
FIG. 3B
FIG. 3A

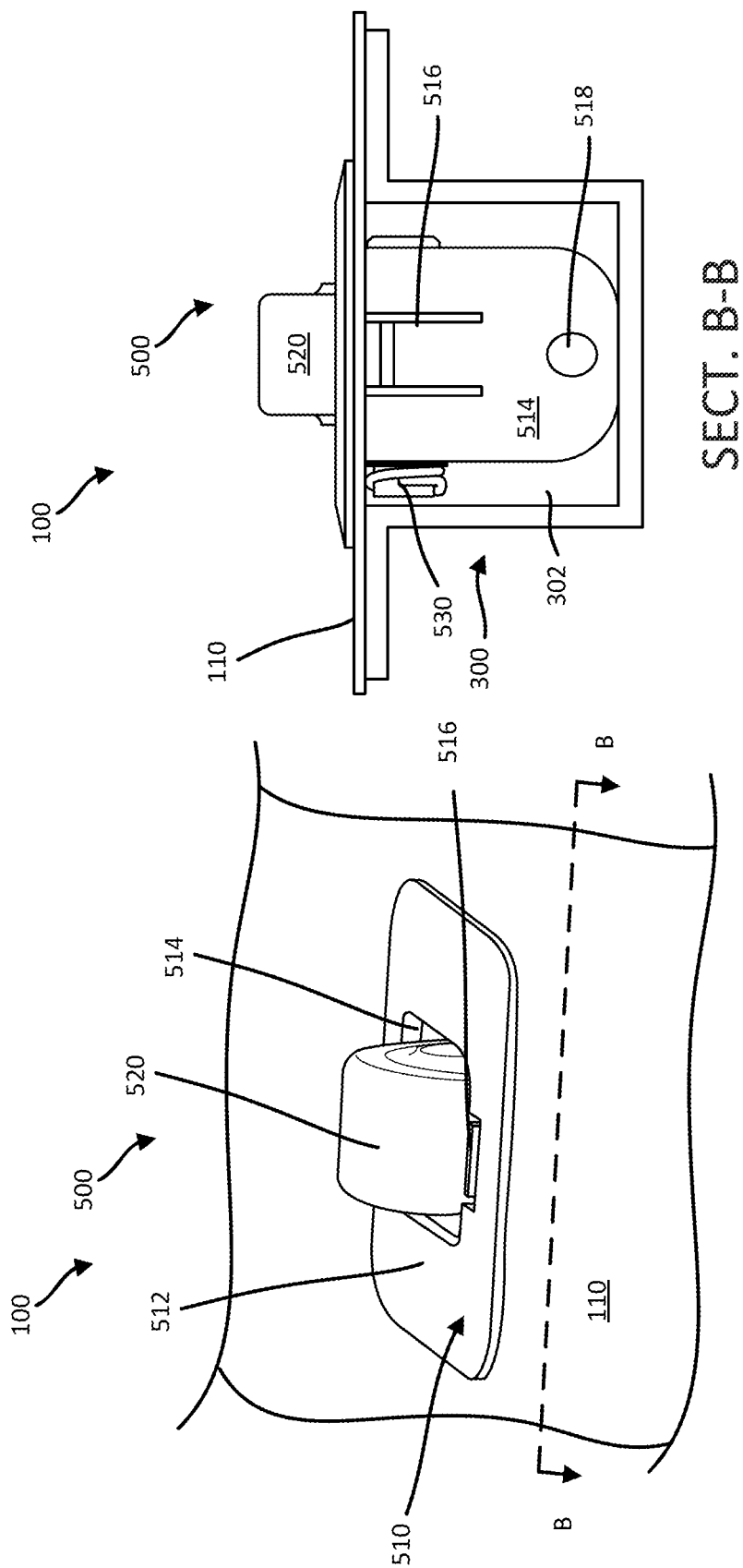

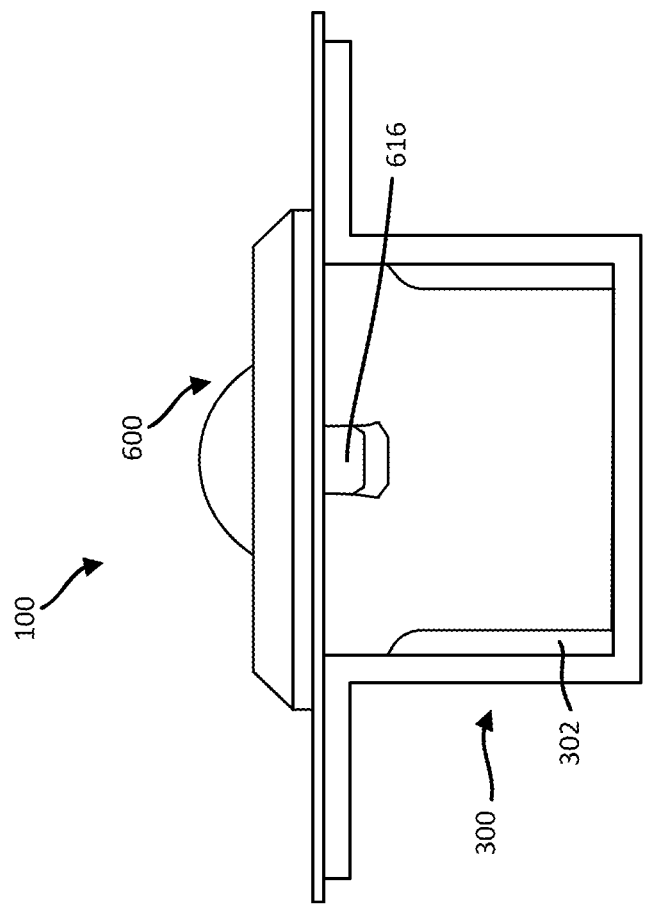
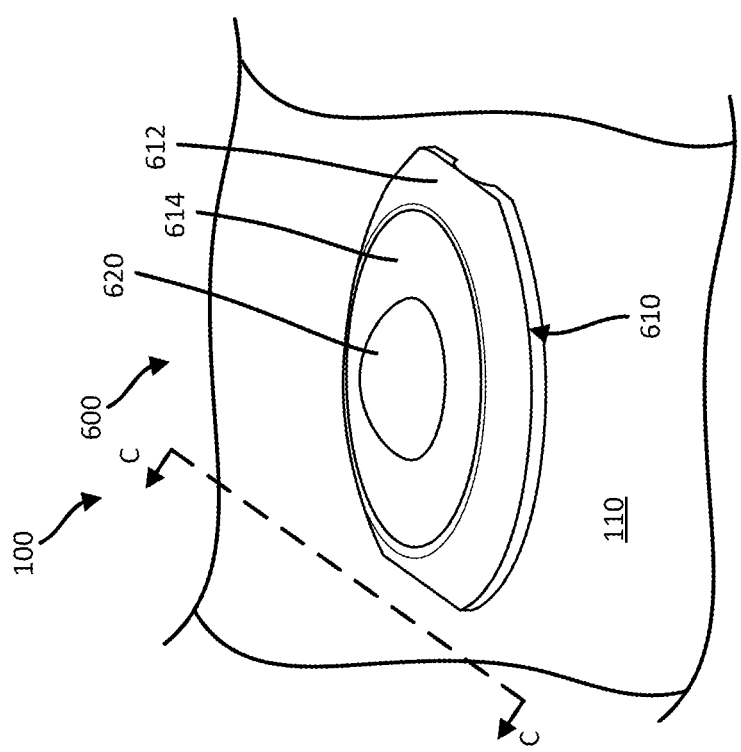
SECT. C-C
FIG. 6B
FIG. 6A

AIRCRAFT CARGO HANDLING SYSTEM ARCHITECTURE

CROSS-REFERENCE TO RELATED APPLICATIONS

This application is a non-provisional of, and claims priority to, and the benefit of U.S. Provisional Application No. 63/024,969, entitled "AIRCRAFT CARGO HANDLING SYSTEM ARCHITECTURE," filed on May 14, 2020, which is hereby incorporated by reference in its entirety.

FIELD

The present disclosure relates generally to cargo handling systems, and more specifically, to an aircraft cargo handling system architecture.

BACKGROUND

Cargo handling systems, such as those used by aircraft for transport of containerized cargo or pallets, also referred to as unit load devices (ULDs), typically include longitudinal trays containing transport rollers positioned along a cargo deck floor to facilitate movement of the ULDs relative to the deck floor. The space between the longitudinal trays is typically filled with floor panels to provide a walking surface. In typical cargo handling systems, the longitudinal trays may be trip hazards for personnel walking through a cargo compartment.

SUMMARY

A cargo handling system is disclosed herein. The cargo handling system may comprise: a first tray extending longitudinally from a first longitudinal end to a second longitudinal end; a second tray disposed laterally adjacent to the first tray, the first tray and the second tray each including a first flange defining a first mating surface and a second flange defining a second mating surface; and a topskin coupled to the first mating surface and the second mating surface of the first flange and the first mating surface and the second mating surface of the second flange.

In various embodiments, the cargo handling system may further comprise a roller assembly coupled to the topskin and disposed within the first tray. The topskin may extend laterally from the first tray to the second tray. The cargo handling system may further comprise a ball transfer unit (BTU) coupled to the topskin and disposed within the first tray. The cargo handling system may further comprise a power drive unit (PDU) disposed between the first tray and the second tray. The first tray and the second tray may be contiguously covered. The first tray and the second tray may each comprise a base, a first sidewall extending from the base to the first flange, a second sidewall extending from the base to the second flange. The first sidewall, the second sidewall, and the base may define a groove configured to receive at least one of a ball transfer unit (BTU) and a roller assembly.

A cargo handling system is disclosed herein. The cargo handling system may comprise: a plurality of trays; a topskin coupled to a top portion of each tray in the plurality of trays; a roller assembly coupled, and disposed partially within, the topskin, the roller assembly comprising: a fitting including a flange and a roller housing, the flange including a bottom surface mated to a top surface of the topskin; and a roller rotatably coupled to the roller housing.

In various embodiments, the roller assembly is disposed in a groove defined by a tray in the plurality of trays. The cargo handling system may further comprise a plurality of the roller assembly. The fitting may further comprise a tab. The fitting may be configured to be press fit into the topskin. The tab may be configured to couple the fitting to the topskin. The plurality of trays may be contiguously covered. The plurality of trays may be made of a composite material.

A cargo handling system is disclosed herein. The cargo handling system may comprise: a plurality of trays; a topskin coupled to a top portion each tray in the plurality of trays; a ball transfer unit (BTU) coupled, and disposed partially within, the topskin, the BTU comprising: a retaining fixture including a flange and a housing, the flange mated to the topskin; and a spherical ball disposed partially within the housing.

In various embodiments, the housing of the retaining fixture is disposed at least partially within a tray in the plurality of trays. The plurality of trays may be contiguously covered. The retaining fixture may be configured to be press fit into the topskin. The plurality of trays may be made of a composite. The topskin may be a metallic topskin.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 3A illustrates a perspective view of a ULD located on a cargo handling system, in accordance with various embodiments;

FIG. 3B illustrates a detail cross-sectional view of a tray from FIG. 3a on a cargo handling system, in accordance with various embodiments;

FIG. 5A illustrates a perspective view of a roller assembly located on a cargo handling system, in accordance with various embodiments;

FIG. 5B illustrates a cross-section view of the roller assembly from FIG. 5B, in accordance with various embodiments;

FIG. 6A illustrates a perspective view of a ball transfer unit (BTU) located on a cargo handling system, in accordance with various embodiments; and FIG. 6B illustrates a cross-section view of the BTU from FIG. 6B, in accordance with various embodiments.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with the nose (i.e., the front end) of an aircraft, or generally, to the direction of flight or motion.

Figure 1:
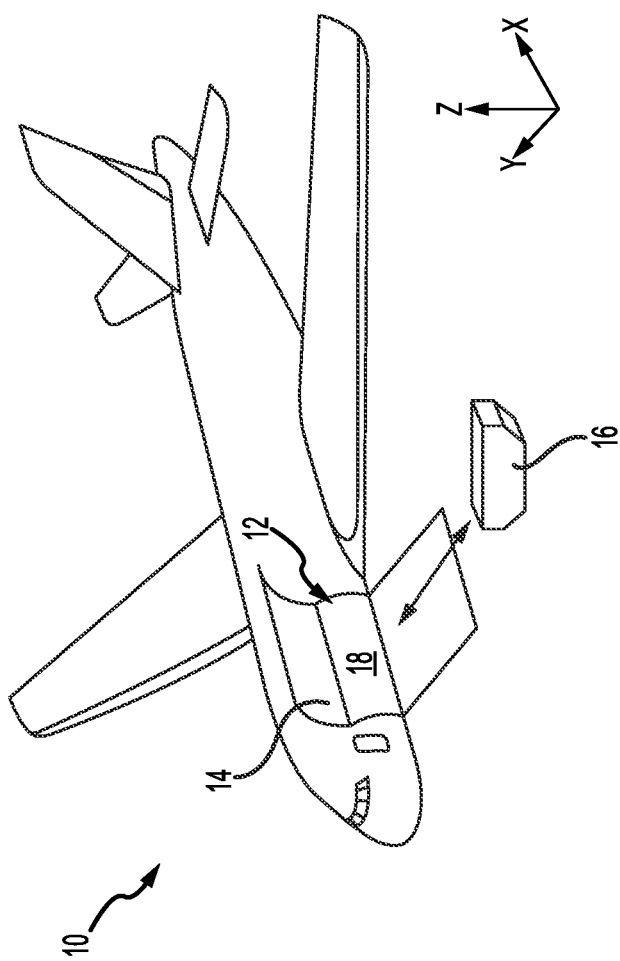
FIG. 1 illustrates an axonometric view of an aircraft being loaded with cargo, in accordance with various embodiments.

With reference to FIG. 1, an aircraft 10 is illustrated. Aircraft 10 includes a cargo compartment 12. A cargo door 14 provides access to cargo compartment 12 from outside aircraft 10. Cargo 16 (e.g., pallets or ULDs) may be loaded and unloaded through cargo door 14 and onto a cargo deck 18 of aircraft 10.

Figure 2:
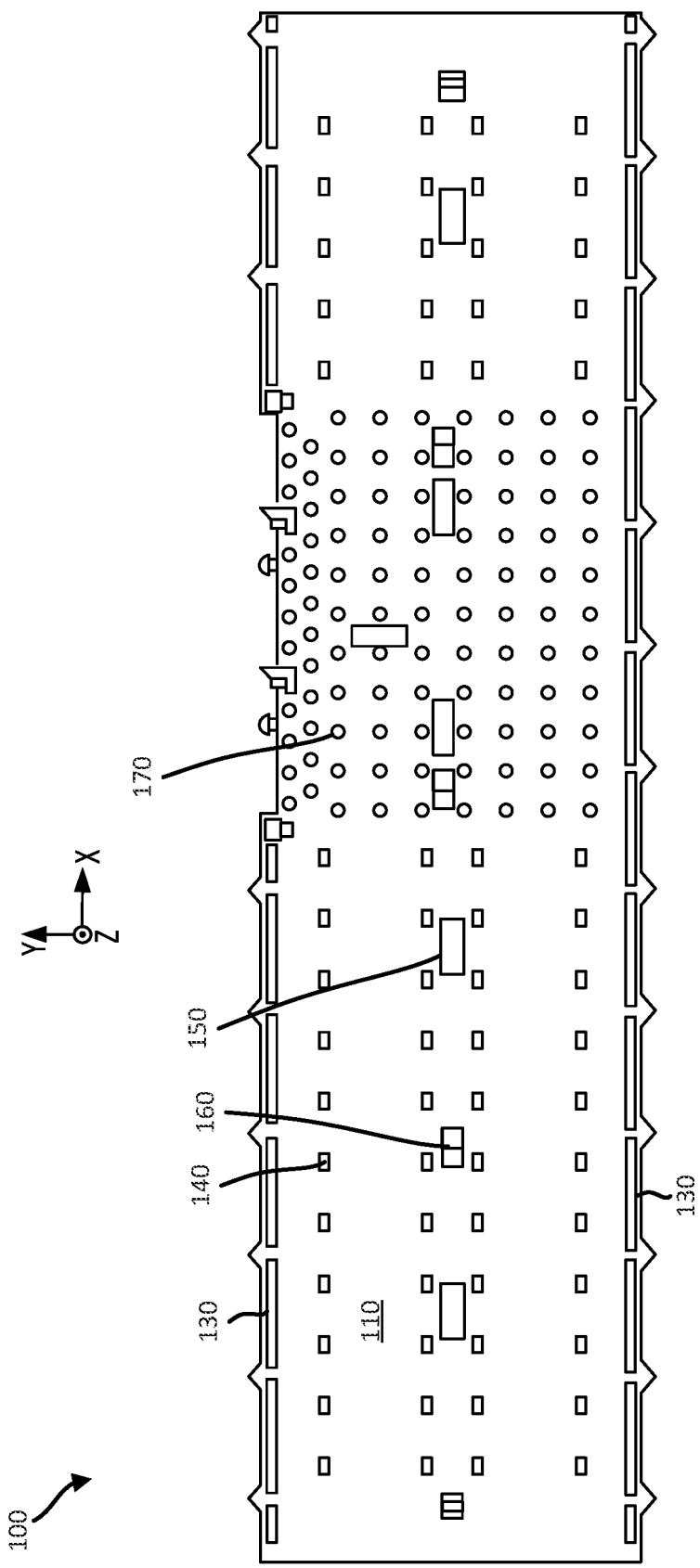
FIG. 2 illustrates a top down view of a ULD located on a cargo handling system, in accordance with various embodiments.

Referring now to FIG. 2, top view of a cargo handling system 100, in accordance with various embodiments, is illustrated. Cargo handling system 100 may be used to load, move, and unload cargo 16 from cargo deck 18. Cargo handling system 100 includes components configured to facilitate translation of cargo 16 along cargo deck 18. For example, cargo handling system 100 may include a topskin 110, a plurality of roller trays (caster trays) disposed below the topskin 110, and a plurality of edge restraint/guides 130. In various embodiments, topskin 110 provide a contiguous flat floor through a cargo compartment (e.g., cargo compartment 12 from FIG. 1).

The plurality of roller trays, which each include one or more rollers 140, may be oriented in a longitudinal direction. As used herein, the term "longitudinal" refers to forward and aft directions (i.e., a direction parallel to the x-axis on the provided X-Y-Z axes). In this regard, the plurality of roller trays may facilitate forward and aft translation of cargo 16. In various embodiments, the plurality of roller trays may be configured to act as floor beams for the topskin 110. In this regard, a proximate portion of each roller tray may couple to an aircraft frame and a top portion of each roller tray may couple to the topskin 110 and support the topskin 110 structurally, in accordance with various embodiments.

In various embodiments, the topskin 110 may be made of metal, composite, or a combination of the two. In various embodiments, the topskin 110 may comprise a metallic top surface and an underlying composite structure. In this regard, the composite structure may better facilitate the strength and stiffness requirements of the topskin 110 when the trays are separated by large distances, and the metal top surface may provide greater robustness and resistance to wear during use.

The plurality of roller trays may further include one or more ball transfer units (BTUs) 170 disposed therein. The BTUs 170 may be disposed proximate the cargo door 14 from FIG. 1. The BTUs 170 may facilitate lateral and longitudinal translation of cargo 16 from FIG. 1. In this regard, the BTUs 170 may rotate about any axis defined by a horizontal plane (e.g., the X-Y plane).

Cargo handling system 100 may further include one or more power drive units (PDUs) 150 configured to propel cargo 16 in a desired direction. PDUs 150 may be located in fittings between adjacent roller trays, located in the plurality of roller trays, and/or in any other desired location along cargo deck 18. The PDUs 150 may be disposed in fittings below the topskin 110 and/or the fittings may be substantially flush with the topskin 110. In this regard, the PDUs may be flush with, or protrude slightly from, the topskin 110.

Edge restraint/guides 130 may be located along the edges of cargo deck 18. Edge restraint/guides 130 may restrict lateral and vertical translation of cargo 16. As used herein, the term "lateral" refers to directions perpendicular to the longitudinal direction (i.e., directions parallel to the y-axis on the provided X-Y-Z axes). As used herein, the term "vertical" refers to directions perpendicular to cargo deck 18 (i.e., direction perpendicular to the X-Y plane and/or parallel to the Z-axis on the provided X-Y-Z axes). In various embodiments, the cargo handling system 100 may include a first cargo row 102 and a second cargo row 104. The first cargo row 102 may be disposed laterally adjacent to the second cargo row 104.

Edge restraint/guides 160 may be located between adjacent roller trays, located in the plurality of roller trays, and/or in any other desired location along cargo deck 18. Edge restraint/guides 130 may restrict longitudinal and vertical translation of cargo 16 during transportation of cargo 16 from FIG. 1. Edge restraint/guides 160 may retract in a respective fitting to a position below or flush with the topskin 110 during loading of cargo 16 from FIG. 1. Once a cargo 16 is in place for transport, a respective edge restraint/guide assembly in the edge restraint/guides 160 may be deployed to restrict longitudinal and vertical translation of cargo 16 during transport.

Referring now to FIG. 3A, a perspective view of a cargo handling system 100, in accordance with various embodiments, is illustrated. In various embodiments, the cargo handling system 100 further comprises a plurality of trays 120. Each tray in the plurality of trays 120 extends longitudinally through the cargo compartment (e.g., cargo compartment 12 from FIG. 1). In various embodiments, the plurality of trays 120 may at least partially structurally support the topskin 110 of the cargo handling system 100. Additionally, in accordance with various embodiments, each tray in the plurality of trays 120 may be configured to house rollers 140, edge restraint/guides 160, and/or PDUs 150. In various embodiments, each tray in the plurality of trays 120 houses rollers 140, and the PDUs 150 and edge restraint/guide assemblies are disposed between adjacent trays in the plurality of trays 120.

In various embodiments, a cargo handling system 100 in accordance with this disclosure may result in greater safety for an operator of the cargo handling system 100. For example, in accordance with various embodiments, the cargo handling system 100 may comprise significantly fewer trip hazards relative to typical cargo handling systems. The cargo handling system 100 comprises a contiguous topskin 110 throughout a respective row for cargo (e.g., cargo 16 from FIG. 1) with only few components raised slightly above the topskin 110 (e.g., rollers 520 and/or spherical balls 620).

In various embodiments, the cargo handling system 100 provides significant improvement in sealing and drainage relative to typical cargo handling systems. The continuous flat floor (e.g., topskin 110) may be sealed easily, and components of the cargo handling system 100 (e.g., roller assembly 500 and BTU 600) may have a designed drainage path (e.g., along trays 300). In this regard, the trays 300 may act as a gutter configured to guide water forward or aft to a specified drainage point.

In various embodiments, the cargo handling system 100 allows for a more efficient interface between an aircraft structure and the plurality of trays 120. In this regard, typical cargo handling systems desire metallic trays for robustness and repairability. In various embodiments, by essentially hiding the plurality of trays 120 below the topskin 110, the plurality of trays 120 may be made of the same material as the aircraft structure (e.g., composites), providing a more efficient interface between the plurality of trays 120 and the aircraft structure.

In various embodiments, the cargo handling system 100 facilitates different load type configurations to be used, both containerized and bulk load configurations. In various embodiments, the topskin 110 being contiguous accomplishes this for a bulk loading configuration, while also providing the equipment desired for a containerized configuration.

In various embodiments, the wire routing for system components (PDUs, powered restraints, etc.) could be done below the topskin 110 while still above the aircraft frame caps of the aircraft structure. In various embodiments, this is an advantage over typical cargo handling systems because typical cargo handling systems wiring is routed below the aircraft frames and around/through other aircraft subsystems. In various embodiments, by moving the wire routing above the frames, the wire routing is moved into the cargo handling system 100 and eliminates an aircraft integrator from having to manage multiple interfaces between these harnesses and the cargo system components that connect to those harnesses.

In various embodiments, the cargo handling system 100 may provide significantly more flexible interface of an underlying aircraft structure relative to typical cargo handling systems. For example, typical metallic tray systems may work for traditional shapes (e.g., blended wing aircraft); however, they do not work well when the shape is irregular. As such, in accordance with various embodiments, the cargo handling system 100 may accommodate any shape through running the plurality of trays 120 diagonally across the aircraft structure, or whichever direction is desired to adequately interface with the aircraft structure. In this regard, in accordance with various embodiments, the cargo handling system 100 may more easily transmit loads to the aircraft side body. In various embodiments, the cargo handling system 100 may provide additional flexibility relative to typical cargo handling systems in terms of where rollers 140 and/or BTUs 170 may be placed. In various embodiments, the cargo handling system 100 may further provide flexibility of placing the PDUs 150 and edge restraint/guides 130, 160, since these components may be installed anywhere under the topskin 110 and tied back into a nearest tray.

Referring now to FIG. 3B, a detail cross-sectional view of a tray 300 in the plurality of trays 120 is illustrated, in accordance with various embodiments. In various embodiments, the tray 300 may be made of a metal, a composite, or the like. In various embodiments, by having the tray 300 disposed below the topskin 110 from FIG. 3A, the trays 300 may be protected from a damage prone environment (e.g., cargo deck 18 from FIG. 1). In this regard, a less damage tolerant material (e.g., a carbon fiber composite, or the like), yet lighter material, may be utilized for tray 300. In accordance with various embodiments, by utilizing carbon fiber composites to make the tray 300, significant weight savings for the cargo handling system 100 from FIG. 3A may be realized.

In various embodiments, the tray 300 comprises a base 310, a first sidewall 320, a second sidewall 330, a first flange 340, and a second flange 350. The base 310 may comprise a mating surface 312 configured to couple to an aircraft frame. The base 310 may be coupled to a respective aircraft frame by a fastener, an adhesive, or the like. In various embodiments, the first sidewall 320 extends vertically from the base 310 on a first side of the base 310. Similarly, the second sidewall 330 extends vertically from the base 310 on a second side of the base 310, the second side being opposite the first side. Although illustrated as extending vertically, the sidewalls 320, 330 are not limited in this regard. For example, the sidewalls 320, 330 may extend from the base 310 at an angle, in accordance with various embodiments. The first sidewall 320 extends from a proximal end 322 to a distal end 324. The proximal end 322 is proximate base 310 and the distal end 324 is proximate the first flange 340. Similarly, the second sidewall 330 extends from a proximal end 332 proximate the base 310 to a distal end 334 proximate the second flange 350.

In various embodiments, the base 310, the first sidewall 320, and the second sidewall 330 define a groove 302. In various embodiments, the groove 302 may be configured to receive an edge restrain/guide assembly, a PDU assembly, a roller assembly, a BTU assembly, or any other assembly for use in a cargo handling system, as described further herein.

In various embodiments, the first flange 340 extends away from the distal end 324 of the first sidewall 320 in a lateral direction, and the second flange 350 extends away from the second sidewall 330 in a lateral direction. In various embodiments, the first flange 340 and the second flange 350 extend in opposite directions and away from each other. The first flange 340 includes a mating surface 342 and the second flange 350 includes a mating surface 352. The mating surfaces 342, 352 are configured to couple to a topskin of a cargo handling system (e.g., topskin 110 from FIG. 3A). The first flange 340 and the second flange 350 may be coupled to the topskin (e.g., topskin 110 from FIG. 3A) by a fastener, an adhesive, or the like. In various embodiments, the first flange 340 and the second flange 350 may be substantially parallel to the base 310. "Substantially parallel," as used herein, refers to parallel +/−5 degrees.

Figure 4:
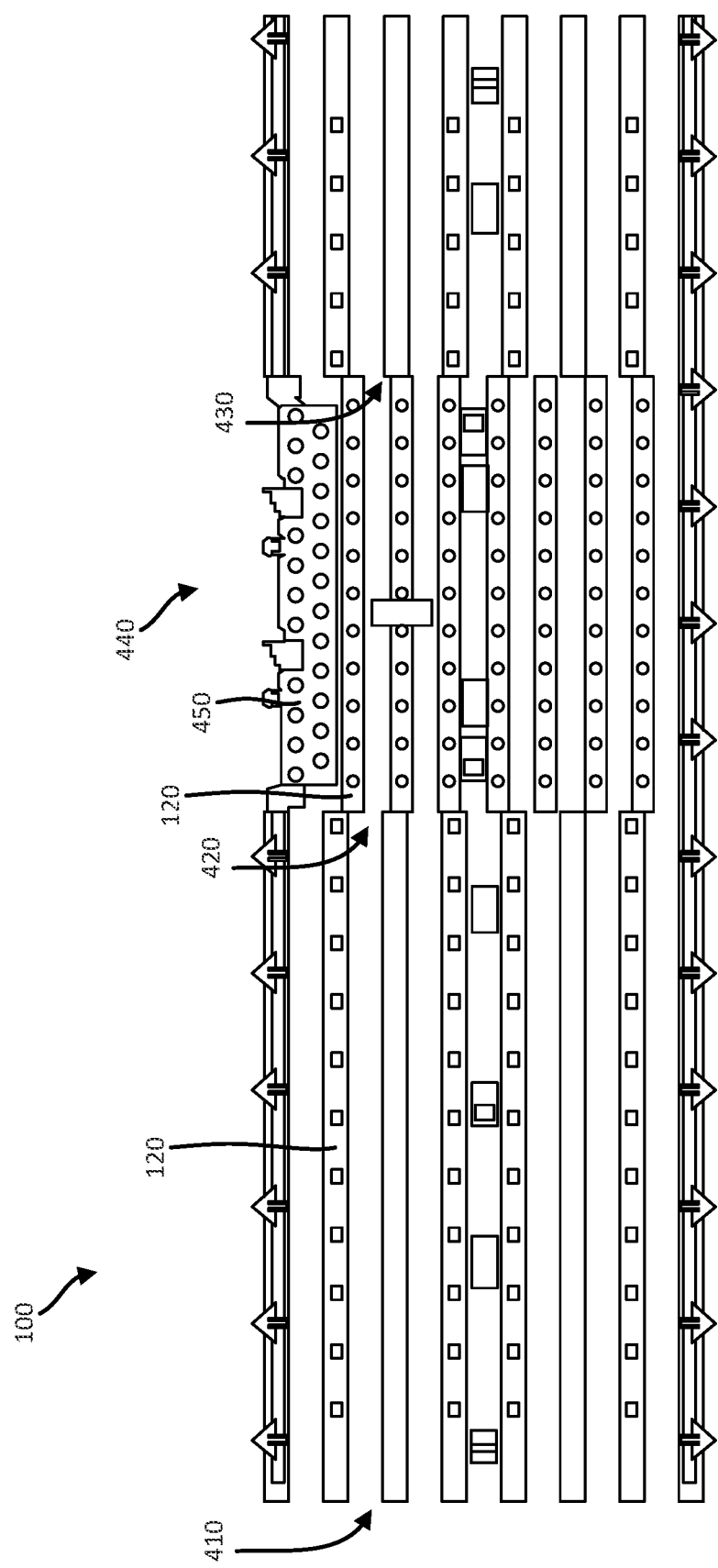
FIG. 4 illustrates a top down view of a ULD located on a cargo handling system without a topskin, in accordance with various embodiments.

Referring now to FIG. 4, a top view of a cargo handling system 100 is illustrated with a topskin 110 from FIG. 1 removed, in accordance with various embodiments. The cargo handling system 100 comprises a plurality of trays 120 in accordance with the tray 300 from FIG. 3. In various embodiments, a first column of trays 410 of the plurality of trays 120 may extend from a first longitudinal end at an aft end of a cargo deck (e.g., cargo deck 18 from FIG. 1) to a second longitudinal end proximate an aft end of the cargo door (e.g., cargo door 14 from FIG. 1). A second column of trays 420 of the plurality of trays 120 may extend longitudinally cross an entranceway 440 to the cargo deck (e.g., cargo deck 18 from FIG. 1). For example, the second column of trays 420 may extend longitudinally from the second longitudinal end proximate the aft end of the cargo door to a third longitudinal end proximate a forward end of the cargo door (e.g., cargo door 14 from FIG. 1). Stated otherwise, the second column of trays 420 may extend longitudinally approximately the width of the cargo door. A third column of trays 430 of the plurality of trays 120 may extend longitudinally from the third longitudinal end forward to a fourth longitudinal end proximate a forward end of the cargo deck.

In various embodiments, the second column of trays 420 may be configured to receive the BTUs 170, and the first column of trays 410 and the third column of trays 430 may be configured to receive rollers 140. Although illustrated as comprising multiple columns of trays, this disclosure is not limited in this regard. For example, in various embodiments, the plurality of trays 120 may extend longitudinally a length of the cargo deck (e.g., cargo deck 18), and configured to receive the BTUs 170 and the rollers 140. Similarly, although a single row for cargo is illustrated, any number of cargo rows is within the scope of this disclosure.

In various embodiments, the entranceway may include ball mats (or caster panels) 450 due to the regular abuse of the doorsill area (e.g., the entranceway 440). In various embodiments, the entranceway 440 may comprise trays in the column of trays 420. The disclosure is not limited in this regard, and one skilled in the art may appreciated that various configurations are within the scope of this disclosure.

Referring now to FIG. 5A, a perspective view of a roller assembly 500 for a cargo handling system 100, in accordance with various embodiments is illustrated. In various embodiments, the cargo handling system 100 comprises a roller assembly 500 and the topskin 110. In various embodiments, the roller assembly 500 comprises a fitting 510 and a roller rotatably coupled to the fitting 510. The fitting 510 comprises a flange 512 and a roller housing 514. The flange 512 mates with the topskin 110. In various embodiments, the fitting 510 may further comprise a tab 516. The tab 516 may be configured to press against the topskin 110 upon assembly. In other words, the fitting 510 may be configured to be press fit into the topskin 110. To remove the roller assembly 500, the tab 516 may be pressed towards the flange 512, and the roller assembly 500 may be removed vertically from the topskin 110. In this regard, in accordance with various embodiments, a roller assembly 500 may be more easily removed or assembly in a cargo handling system 100 relative to typical cargo handling systems.

Referring now to FIG. 5B, a cross-sectional view of the roller assembly 500 of a cargo handling system 100, in accordance with various embodiments, is illustrated. In various embodiments, the fitting 510 may be disposed in the groove 302 of the tray 300. In various embodiments, the fitting 510 may further comprise an aperture 518 disposed longitudinally through the roller housing 514. The aperture 518 may allow for drainage to travel more easily through the tray 300 during transport of cargo (e.g., cargo 16 from FIG. 1). The roller 520 may be rotatably coupled to the fitting 510 by any method known in the art. For example, in accordance with various embodiments, the roller 520 may be rotatably coupled to the fitting 510 by a cotter pin 530, or the like.

Referring now to FIG. 6A, a perspective view of a BTU 600 for a cargo handling system 100, in accordance with various embodiments is illustrated. In various embodiments, the cargo handling system 100 comprises a BTU 600 and the topskin 110. In various embodiments, the BTU 600 comprises a retaining fixture 610 and a spherical ball 620 operably coupled to retaining fixture 610. The retaining fixture 610 comprises a flange 612 and a housing 614. The flange 612 mates with the topskin 110. The housing 614 retains the spherical ball 620 within the retaining fixture 610. In various embodiments, the BTU 600 may comprise a plurality of spherical balls within the housing 614 and configured to allow the spherical ball 620 to rotate.

Referring now to FIG. 6B, a cross-sectional view of the BTU 600 of a cargo handling system 100, in accordance with various embodiments, is illustrated. In various embodiments, the retaining fixture 610 may be may be disposed in the groove 302 of the tray 300. The roller 520 may be rotatably coupled to the fitting 510 by any method known in the art. For example, in accordance with various embodiments, the roller 520 may be rotatably coupled to the fitting 510 by a cotter pin 530, or the like. In various embodiments, the retaining fixture 610 may further comprise a tab 616. The tab 616 may be configured to press against the topskin 110 upon assembly. In other words, the retaining fixture 610 may be configured to be press fit into the topskin 110. To remove the BTU 600, the tab 616 may be pressed towards the flange 612, and the BTU 600 may be removed vertically from the topskin 110. In this regard, in accordance with various embodiments, a BTU 600 may be more easily removed or assembly in a cargo handling system 100 relative to typical cargo handling systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo handling system, comprising:
a cargo compartment extending from a first longitudinal end at an aft end of a cargo deck of the cargo compartment through an aft section to a second longitudinal end proximate an aft end of a cargo door, longitudinally from the second longitudinal end proximate the aft end of the cargo door to a third longitudinal end proximate a forward end of the cargo door, and longitudinally from the third longitudinal end through a forward section forward to a fourth longitudinal end proximate a forward end of the cargo deck;
a plurality of trays disposed throughout the cargo compartment, the plurality of trays including a first tray and a second tray;
the first tray extending longitudinally from the first longitudinal end to the fourth longitudinal end;
the second tray disposed laterally adjacent to the first tray and extending longitudinally from the first longitudinal end to the fourth longitudinal end, the first tray and the second tray each including a first flange defining a first top mating surface and a second flange defining a second top mating surface; and
a topskin disposed on and mated to the first top mating surface and the second top mating surface of the first tray, the topskin further coupled to the first top mating surface and the second top mating surface of the second tray, wherein:
the first tray and the second tray are disposed entirely below the topskin, and
the plurality of trays are continuously covered from the first longitudinal end to the fourth longitudinal end.

2. The cargo handling system of claim 1, further comprising a roller assembly coupled to the topskin and disposed within the first tray.

3. The cargo handling system of claim 1, wherein the topskin extends laterally contiguously from the first top mating surface of the first tray, to the second top mating surface of the first tray, to the first top mating surface of the second tray, to the second top mating surface of the second tray.

4. The cargo handling system of claim 1, further comprising a ball transfer unit (BTU) coupled to the topskin and disposed within the first tray.

5. The cargo handling system of claim 1, further comprising a power drive unit (PDU) disposed between the first tray and the second tray.

6. The cargo handling system of claim 1, wherein the first tray and the second tray are contiguously covered over an entirety of the first tray and the second tray.

7. The cargo handling system of claim 1, wherein:
the first tray and the second tray each comprise a base, a first sidewall extending from the base to the first flange, a second sidewall extending from the base to the second flange, and
the first sidewall, the second sidewall, and the base defining a groove configured to receive at least one of a ball transfer unit (BTU) and a roller assembly.

8. A cargo handling system, comprising,
a cargo compartment extending from a first longitudinal end at an aft end of a cargo deck of the cargo compartment through an aft section to a second longitudinal end proximate an aft end of a cargo door, longitudinally from the second longitudinal end proximate the aft end of the cargo door to a third longitudinal end proximate a forward end of the cargo door, and longitudinally from the third longitudinal end through a forward section forward to a fourth longitudinal end proximate a forward end of the cargo deck;
a plurality of trays, each of the plurality of trays comprising a base, a first sidewall extending from the base to a first flange, a second sidewall extending from the base to a second flange, the first flange extending outward in a first direction from the first sidewall, the second flange extending outward in a second direction from the second sidewall the second direction opposite the first direction, the first flange defining a first top mating surface, the second flange defining a second top mating surface, wherein the plurality of trays are continuously covered from the first longitudinal end to the fourth longitudinal end;
a topskin disposed on and mated to the first top mating surface and the second top mating surface of each of the plurality of trays, wherein the first sidewall, the second sidewall, the base, and the topskin at least partially define a hollow chamber, and wherein each of the plurality of trays is disposed entirely below the topskin;
a roller assembly coupled, and disposed partially within, the hollow chamber, the roller assembly comprising:
a fitting including a flange, a tab, and a roller housing, the flange including a bottom surface mated to a top surface of the topskin, the flange disposed entirely above the topskin, the fitting configured to be press fit into the topskin, the tab configured to supply a retaining force against the topskin to couple the fitting to the topskin, the roller housing disposed within the hollow chamber; and
a roller rotatably coupled to the roller housing.

9. The cargo handling system of claim 8, wherein the roller assembly is disposed in a groove defined by a first tray in the plurality of trays.

10. The cargo handling system of claim 8, further comprising a plurality of the roller assembly.

11. The cargo handling system of claim 8, wherein the plurality of trays are made of a composite material.

12. A cargo handling system, comprising:
a cargo compartment extending from a first longitudinal end at an aft end of a cargo deck of the cargo compartment through an aft section to a second longitudinal end proximate an aft end of a cargo door, longitudinally from the second longitudinal end proximate the aft end of the cargo door to a third longitudinal end proximate a forward end of the cargo door, and longitudinally from the third longitudinal end through a forward section forward to a fourth longitudinal end proximate a forward end of the cargo deck;

a plurality of trays, each of the plurality of trays extending longitudinally from the first longitudinal end to the fourth longitudinal end, each of the plurality of trays including a first flange defining a first top mating surface and a second flange defining a second top mating surface;

a topskin disposed on and mated to the first top mating surface and the second top mating surface of each of the plurality of trays;

a ball transfer unit (BTU) coupled, and disposed partially within, the topskin, the BTU comprising: a retaining fixture including a flange and a housing, the flange mated to the topskin; and a spherical ball disposed partially within the housing, wherein:

the plurality of trays are contiguously covered over an entirety of the plurality of trays, each of the plurality of trays is disposed entirely below the topskin, and the plurality of trays are continuously covered from the first longitudinal end to the fourth longitudinal end.

13. The cargo handling system of claim 12, wherein the housing of the retaining fixture is disposed at least partially within a first tray in the plurality of trays.

14. The cargo handling system of claim 12, wherein the retaining fixture is configured to be press fit into the topskin.

15. The cargo handling system of claim 12, wherein the plurality of trays are made of a composite.

16. The cargo handling system of claim 15, wherein the topskin comprises a metal top surface and a composite structure disposed below the metal top surface.

17. The cargo handling system of claim 12, wherein the topskin is configured to form a contiguous flat floor through the cargo compartment.

18. The cargo handling system of claim 12, wherein the flange is disposed entirely above the topskin.

19. The cargo handling system of claim 12, further comprising a plurality of the BTU, wherein each of the plurality of the BTU are disposed throughout and longitudinally between the second longitudinal end and the third longitudinal end.

20. The cargo handling system of claim 19, further comprising a plurality of roller assemblies disposed throughout the forward section and the aft section of the cargo compartment.

* * * * *